J. HOOVER.
COMBINED CUT-OFF AND FILTER.

No. 192,696. Patented July 3, 1877.

WITNESSES:

INVENTOR:
J. Hoover.
BY
ATTORNEYS.

UNITED STATES PATENT OFFICE.

JOHN HOOVER, OF CRAWFORDSVILLE, INDIANA.

IMPROVEMENT IN COMBINED CUT-OFF AND FILTER.

Specification forming part of Letters Patent No. 192,696, dated July 3, 1877; application filed May 5, 1877.

*To all whom it may concern:*

Figure 1:
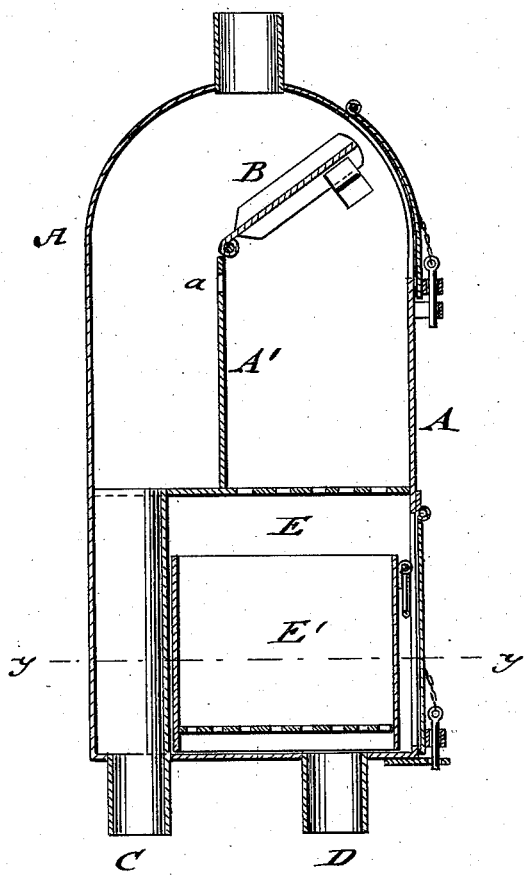
Figure 2:
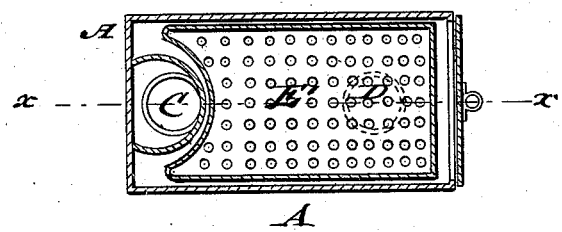

Be it known that I, JOHN HOOVER, of Crawfordsville, county of Montgomery, and State of Indiana, have invented a new and Improved Combination Cut-Off and Filter, of which the following is a specification:

In the accompanying drawing, Figure 1 represents a vertical longitudinal section of my improved combination cut-off and filter on line $x\,x$, Fig. 2. Fig. 2 is a horizontal section of the same on line $y\,y$, Fig. 1.

Similar letters of reference indicate corresponding parts.

The invention relates to an improved cut-off and filter combined, which may be used so as to conduct first the dirty water from the roof out through the waste-pipe, and passing then the water through the filtering-chamber, in which the filtering material can be readily replaced, as required; and the invention consists of a cut-off combined with a filtering device, the partition between the cut-off having vent-holes to pass any surplus water.

In the drawing, A represents a cut-off of the customary construction as used with pipes for conducting the rain-water from the roof to the collecting-cistern. The cut-off is provided with a hinged shedding-gate, B, that is supported in a suitable manner on either side of the supply-opening below the same, so as to connect the supply-pipe with the waste-pipe C or the cistern-pipe D. At one side of the partition A', and above the pipe D, is arranged a filtering-chamber, E', in which only suitable material, such as sponge, wool, or other fibrous material, or charcoal, &c., is placed. The filtering material may be placed in a box or receptacle, E, with perforated bottom, to be readily taken out through a side door, for being conveniently replaced from time to time, as required. The partition-wall A' is provided above the filtering-chamber with vent-holes $a$, for the surplus water to run off through the same and the waste-pipe, to prevent any choking of the device. The water is allowed to run off through the waste-pipe until the roof is cleaned by the rain, it being then turned and passed through the filtering-chamber to the cistern, being again passed through the waste pipe when the cistern is full. Thus the water is furnished free of all impurities to the cistern, and collected in a better and healthier condition for domestic use.

Having thus fully described my invention, I claim as new and desire to secure by Letters Patent—

1. The combination of a cut-off, A, having hinged gate B, partition A', and exit-pipes C D, with a filtering-chamber, E', and removable box or receptacle E, for the filtering material, substantially as specified.

2. The partition-wall of the cut-off A, having exit-holes $a$ for the surplus water above the filtering device, for the purpose specified.

JOHN HOOVER.

Witnesses:
 HOSEN H. RISTINE,
 M. W. BRUNER.